United States Patent [19]
Köster et al.

[11] Patent Number: 5,697,635
[45] Date of Patent: Dec. 16, 1997

[54] PNEUMATIC SUSPENSION ASSEMBLY

[75] Inventors: Rolf Köster, Karlsruhr; Jörg Fischer, Esslingen; Stephan Walterspiel, Baden-Baden; Bernd Schildhorn, Bischweier; Erich Rohm, Loffenau, all of Germany

[73] Assignee: Mercedes-Benz AG, Stuttgart, Germany

[21] Appl. No.: 572,553

[22] Filed: Dec. 14, 1995

[30] Foreign Application Priority Data

Dec. 14, 1994 [DE] Germany .................. 44 44 549.0

[51] Int. Cl.⁶ .................................................. B60G 11/26
[52] U.S. Cl. ................................... 280/711; 280/702
[58] Field of Search ............................ 280/714, 702, 280/711, 707

[56] References Cited

U.S. PATENT DOCUMENTS

| | | | |
|---|---|---|---|
| 4,834,418 | 5/1989 | Buma et al. | 280/711 |
| 5,261,691 | 11/1993 | Laichinger | 280/714 |
| 5,265,913 | 11/1993 | Scheffel | 280/714 |
| 5,273,308 | 12/1993 | Griffiths | 280/714 |
| 5,338,010 | 8/1994 | Haupt | 280/714 |
| 5,593,176 | 1/1997 | Campbell et al. | 280/707 |

FOREIGN PATENT DOCUMENTS

| | | |
|---|---|---|
| 0215315 | 3/1987 | European Pat. Off. . |
| SEARCH | 12/1996 | European Pat. Off. . |
| 1 505 497 | 9/1969 | Germany . |
| 3528830 | 2/1987 | Germany . |
| 3619402 | 12/1987 | Germany . |
| 4316968 | 11/1994 | Germany . |
| 2151746 | 7/1985 | United Kingdom . |
| 2170572 | 8/1986 | United Kingdom . |

*Primary Examiner*—Brian L. Johnson
*Assistant Examiner*—Jonathan E. Butts
*Attorney, Agent, or Firm*—Evanson McKeown Edwards & Lenahan, PLLC

[57] ABSTRACT

A pneumatic suspension assembly is provided with an air spring chamber that changes its volume as a function of suspension travel, as well as a pneumatically controlled shock absorber whose pneumatic control input can be connected with the air spring chamber and with a compressed air source or compressed air supply chamber. In this manner, increased damping during critical driving states can be ensured, in addition to a shock absorber control that is independent of the load.

15 Claims, 1 Drawing Sheet

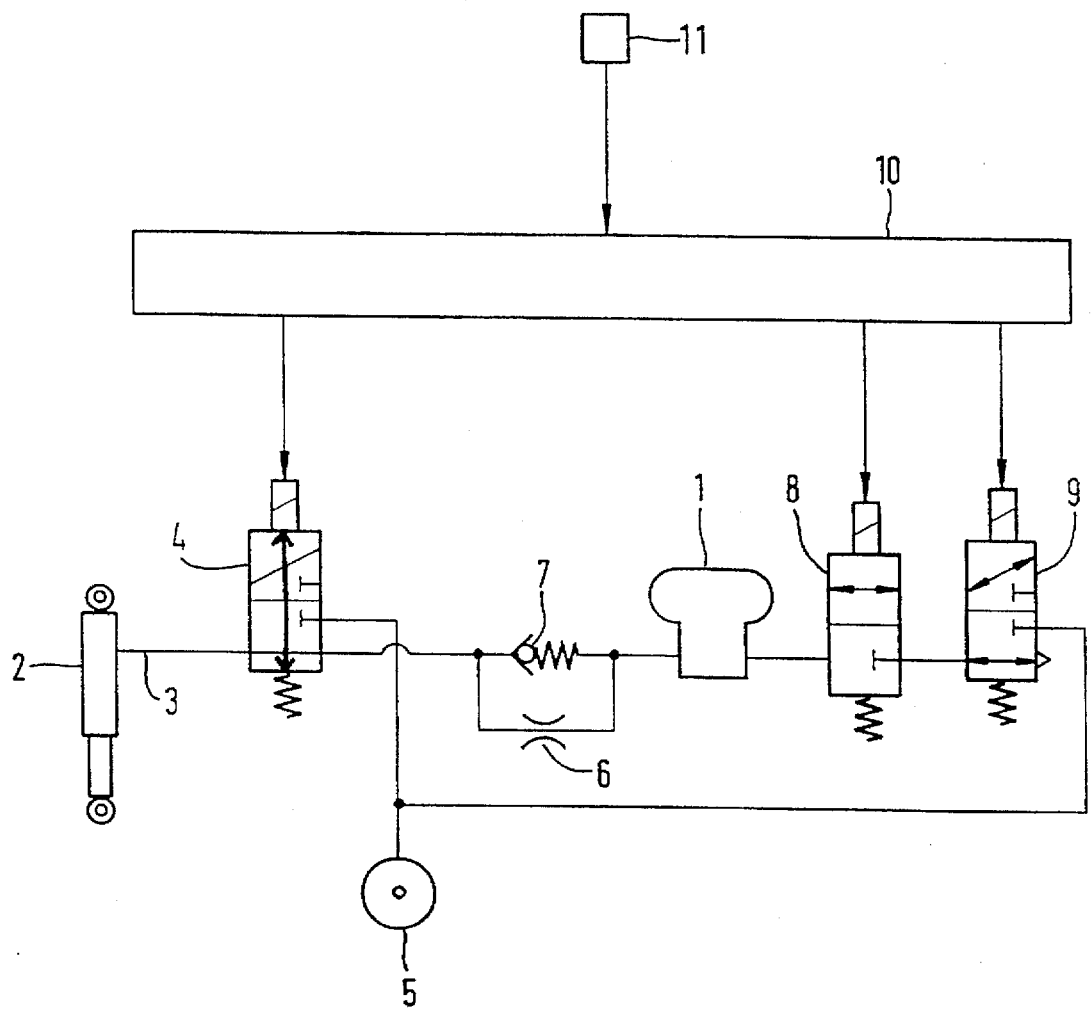

PNEUMATIC SUSPENSION ASSEMBLY

BACKGROUND AND SUMMARY OF THE INVENTION

The invention relates to a pneumatic suspension assembly, especially for motor vehicles, with air spring chambers which change their volumes as a function of suspension travel, and pneumatically controlled shock absorbers whose pneumatic control input is connected with the air spring chamber.

Pneumatic suspension systems are already in relatively frequent use in motor vehicles, especially trucks. In these systems, as a rule, level regulation is provided which makes it possible to drive the vehicle as required with a low clearance in order for example to increase the possible load height or to set the clearance to higher levels in order for example to permit improved comfort or special protection of the load on poor roads.

In conjunction with pneumatic suspension systems, shock absorbers have already been used that operate as a function of the load. These are pneumatically controllable shock absorbers whose pneumatic control input is connected with an air spring chamber of the pneumatic suspension system associated with the shock absorber. Since the pneumatic pressure in the air spring chamber changes as a function of the load, this parameter can be basically used for load-dependent shock absorber control.

In addition, air spring systems have already been tested in which the pneumatic control input of the shock absorbers can be connected by a control valve either with the compressed air source or the compressed air supply of the pneumatic suspension, or with the atmosphere. The valve can be controlled by means of electronics connected on the input side with sensors to record the movements of the body relative to the axle. In this manner, the shock absorber can be switched to firm damping during critical body movements.

In addition, it is basically known to control electrically controllable shock absorbers by means of electronics connected on the input side with sensors for recording various parameters, for example with sensors for body movements as well as additional sensors for the load status of the vehicle.

An object of the invention, in an air suspension assembly of the type recited at the outset, is to be able to take into account without excessive construction expense, parameters in addition to the load for controlling the shock absorbers.

This object is achieved according to the invention by virtue of the fact that the connection between the pneumatic control input of the shock absorber and the air spring chamber can be shut off and the control input can be connected with a source of compressed air or a compressed air supply chamber of the suspension assembly.

The invention is based on the general idea of controlling the basic setting of the shock absorber by the air pressure from the air spring chamber and thus taking the load of the vehicle into account without special load sensors being required. On the other hand, sharply increased damping can be set if necessary by connecting the control input of the shock absorber with the pneumatic pressure source or compressed air supply chamber.

According to one preferred embodiment of the invention, a throttle is located in the blockable connection between the air spring chamber and the control input in order to decouple the control input from rapid dynamic pressure variations in the pneumatic pressure in the air spring chamber. It has proven advantageous in this regard to provide a check valve in parallel with the throttle, said valve opening in the direction of the air spring chamber and, in an especially preferred manner, being loaded with a preset force in the closing direction. With this arrangement, the pneumatic control input of the shock absorber, following connection with the pneumatic pressure source or compressed air supply chamber, when a transition to normal operation is made, i.e. when the control input is connected with the air spring chamber, can be rapidly vented into the air spring chamber until a pneumatic pressure is established at the pneumatic control input that corresponds to an average of the pneumatic pressure in the air spring chamber.

If, upon said venting of the pneumatic control input and the resultant supply of compressed air into the air spring chamber, a (slight) elevation of the clearance of the vehicle is intended to occur, this change is compensated by the level regulation regularly assigned to the air suspension.

Other objects, advantages and novel features of the present invention will become apparent from the following detailed description of the invention when considered in conjunction with the accompanying drawings.

BRIEF DESCRIPTION OF THE DRAWINGS

The single drawing FIGURE shows a schematic diagram of a suspension assembly according to the invention.

DETAILED DESCRIPTION OF THE DRAWINGS

Between a chassis (not shown) of a motor vehicle (likewise not shown) and a vehicle axle (not shown), an air spring bellows 1 and, parallel thereto, a pneumatically controllable shock absorber 2 are arranged in a basically known manner.

Shock absorber 2 has a pneumatic control input 3 connectable by means of a control valve 4, designed in the manner of a 3/2-way valve, either with the interior of air spring bellows 1 or with a compressed air supply chamber 5 or another pneumatic pressure source.

In the air line between control valve 4 and air spring bellows 1, a throttle 6 and, parallel to it, a check valve 7 loaded in the closed position by a spring, are provided which can be traversed by the flow only in the direction of air spring bellows 1.

In addition, compressed air supply chamber 5 is connected with air spring bellows 1 by level control valves 8 and 9 which allow connecting air spring bellows 1 with the atmosphere for venting or with compressed air supply chamber 5 for introducing compressed air, or closing it off from the outside.

Valves 4, 8, and 9 are normally held in the switch positions shown by return springs or the like, in which positions air spring bellows 1 is connected with control input 3 of the shock absorber and in addition is shut off from the atmosphere and from compressed air supply chamber 5.

These valves 4, 8, and 9 can be controlled by means of an electronic control circuit 10 as a function of sensors 11 connected on the input side of control circuit 10, said sensors for example recording the distance between the axles and the body and from whose signals the movement of the axle relative to the body can then be determined in terms of both direction and speed.

If the electronics "notices" that the distance between the axles and the body is changing excessively with respect to a set value, level control valves 8 and 9 are controlled in order to increase or decrease this distance, with air spring bellows 1 being connected briefly either with compressed air supply chamber 5 or atmosphere.

If control circuit 10 "determines" that excessive vigorous axle movements are occurring relative to the body of the vehicle, because for example the so-called body resonance or the so-called axle or wheel resonance of the suspension system is being excited, control valve 4 is switched to the other position in order to bring control input 3 of shock absorber 2 to a high air pressure and to set shock absorber 2 for increased damping.

As soon as the critical driving state no longer exists, control circuit 10 allows control valve 4 to return to its normal position, whereupon the air pressure present at control input 3 decreases through check valve 7 in a short time, with compressed air being introduced into air spring bellows 1. When air spring bellows 1 is excessively "inflated" and the distance between the axle and body increases, control circuit 10 operates level control valves 8 and 9 in order to release air from air spring bellows 1.

The special advantage of the arrangement according to the invention is that in the normal case there is always a setting of shock absorber 2 that depends upon the load in the vehicle since the average air pressure in air spring bellows 1 represents an analog measure of the load. Nevertheless no sensors of any kind are required to determine the state of the load. To determine critical driving states in which shock absorbers 2 should be set to maximum damping, sensors 11 which are provided in any case will suffice for controlling level control valves 8 and 9, said sensors reacting to the travel position of the vehicle wheels or axles relative to the body, with both the respective direction of motion of the axles relative to the body and also the speeds of movement and accelerations of the axles possibly being determined from the sensor signals by formation of time difference quotients, for example. For this purpose, the signals of sensors 11 need only be evaluated accordingly by control circuit 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A pneumatic suspension assembly for a motor vehicle having a vehicle axle and a vehicle chassis, comprising:
   an air spring chamber interposed between the chassis and the vehicle axle,
   a shock absorber interposed between the chassis and the vehicle axle separately from the air spring chamber,
   a pneumatic control input connected to the shock absorber and
   a compressed air source,
   wherein the control input is selectively connectible with:
   (i) the air spring chamber during normal driving operations such that the shock absorber pressure is controlled by the air spring chamber pressure, and
   (ii) the compressed air source during predetermined driving conditions so as to change damping characteristics of the shock absorber separately from the pressure in the compressed air source.

2. A suspension assembly according to claim 1, wherein said compressed air source is a compressed air supply chamber.

3. A suspension assembly according to claim 1, comprising a switching valve operable in a first switching valve position to communicate the control input with the compressed air source and operable in a second switching valve position to block the compressed air source from the control input while communicating the air spring chamber with the control input.

4. A suspension assembly according to claim 3, comprising a throttle interposed between the air spring chamber and the switching valve.

5. A suspension assembly according to claim 4, comprising a check valve interposed between the air spring chamber and the switching valve in parallel with the throttle, said check valve opening in the direction of the air spring chamber.

6. A suspension assembly according to claim 5, wherein the check valve is loaded in the closing direction with a predetermined force.

7. A suspension assembly according to claim 6, comprising level control valves for selectively:
   venting the air spring chamber, or
   connecting the compressed air source and air spring chamber, or
   closing off the air spring chamber from both atmosphere and the compressed air source.

8. A suspension assembly according to claim 7, comprising sensors for sensing suspension travel characteristics of the axle with respect to the chassis, and an electronic control unit for controlling said level control valves and said switching valve as a function of travel characteristics sensed by said sensors.

9. A suspension assembly according to claim 3, wherein said compressed air source is a compressed air supply chamber.

10. A suspension assembly according to claim 5, wherein said compressed air source is a compressed air supply chamber.

11. A suspension assembly according to claim 6, wherein said compressed air source is a compressed air supply chamber.

12. A suspension assembly according to claim 7, wherein said compressed air source is a compressed air supply chamber.

13. A suspension assembly according to claim 1, comprising level control valves for selectively:
   venting the air spring chamber, or
   connecting the compressed air source and air spring chamber, or
   closing off the air spring chamber from both atmosphere and the compressed air source.

14. A suspension assembly according to claim 13, comprising sensors for sensing suspension travel characteristics of the axle with respect to the chassis, and an electronic control unit for controlling said level control valves and said switching valve as a function of travel characteristics sensed by said sensors.

15. A suspension assembly according to claim 1, wherein said control input is separated from the air spring chamber when it is connected to the compressed air source.

* * * * *